United States Patent
Lai

(10) Patent No.: US 11,609,713 B2
(45) Date of Patent: Mar. 21, 2023

(54) STORAGE DEVICE AND STORAGE CONTROL METHOD

(71) Applicant: HOSIN GLOBAL ELECTRONICS CO., LTD, Shenzhen (CN)

(72) Inventor: Chen-Nan Lai, Shenzhen (CN)

(73) Assignee: HOSIN GLOBAL ELECTRONICS CO., LTD, Shenzhen (CN)

( * ) Notice: Subject to any disclaimer, the term of this patent is extended or adjusted under 35 U.S.C. 154(b) by 0 days.

(21) Appl. No.: 17/371,149

(22) Filed: Jul. 9, 2021

(65) Prior Publication Data
US 2022/0011980 A1    Jan. 13, 2022

(30) Foreign Application Priority Data

Jul. 10, 2020  (CN) .......................... 202010667769.4

(51) Int. Cl.
*G06F 3/06*    (2006.01)
*G10L 15/22*    (2006.01)

(52) U.S. Cl.
CPC .......... *G06F 3/0659* (2013.01); *G06F 3/0605* (2013.01); *G06F 3/0679* (2013.01); *G10L 15/22* (2013.01)

(58) Field of Classification Search
CPC .... G06F 3/0659; G06F 3/0605; G06F 3/0679; G10L 15/22
See application file for complete search history.

(56) References Cited

U.S. PATENT DOCUMENTS

| | | | |
|---|---|---|---|
| 2020/0051309 A1 | 2/2020 | Labbe et al. | |
| 2020/0057561 A1* | 2/2020 | Lai | G06N 3/063 |
| 2020/0073582 A1 | 3/2020 | Chang et al. | |
| 2020/0073591 A1 | 3/2020 | Tsai et al. | |
| 2020/0073593 A1* | 3/2020 | Chen | G06F 3/0679 |
| 2021/0064246 A1* | 3/2021 | Troia | G06N 3/04 |

FOREIGN PATENT DOCUMENTS

| | | |
|---|---|---|
| CN | 109298839 A | 2/2019 |
| CN | 111133409 A | 5/2020 |

* cited by examiner

*Primary Examiner* — Nicholas J Simonetti

(57) ABSTRACT

A storage device and a storage control method where the storage device includes a flash memory controller, an artificial intelligence (AI) processor and a flash memory storage chip set. The flash memory controller is connected with the AI processor and the flash memory storage chip set separately. The flash memory controller is configured to send original data to be stored to the AI processor when receiving an AI extension instruction from a host, and store tag data from the AI processor in the flash memory storage chip set. The AI processor is configured to convert the original data from the flash memory controller into the tag data by a predetermined algorithm and send the tag data to the flash memory controller. The flash memory controller stores the tag data in the flash memory storage chip set.

15 Claims, 3 Drawing Sheets

STORAGE DEVICE AND STORAGE CONTROL METHOD

CROSS-REFERENCE TO RELATED APPLICATION

The present application claims foreign priority to Chinese Patent Application No. CN202010667769.4, titled "STORAGE DEVICE AND STORAGE CONTROL METHOD", filed on Jul. 10, 2020 in the State Intellectual Property Office of China, and the entire contents of which is hereby incorporated by reference.

TECHNICAL FIELD

The present disclosure relates to a field of storage device technology, and in particular to a storage device and a storage control method.

BACKGROUND

A memory is a memory component configured to store programs and various data information. A solid state disk (SSD) is a hard disk made of an array of solid-state electronic storage chips. The SSD is composed of a control unit and a storage unit (a FLASH chip and a DRAM chip). The SSD has a fast data reading speed and is adaptable to a wide temperature range, so the SSD is widely used in military, automotive, industrial control, video surveillance, network monitoring, network terminals, electric power, medical, aviation, navigation equipment, and many other fields. In addition, in many other electronic products, such as monitoring systems, a large number of portable storage devices (such as CF cards, SD cards, TF cards, USB interface flash drives, etc.) are applied.

However, above mentioned storage devices only store data according to instructions from a host (such as a central processing unit or a microcontroller), and the storage devices do not process data to be stored, which causes a large amount of useless data to occupy a storage space of the storage devices (for example, in a surveillance video, it is necessary to store background data of each frame of image), resulting in a waste of storage space.

SUMMARY

Technical problem to be solved by the embodiments of the present disclosure is to provide a storage device and a storage control method in view of the above-mentioned problems that conventional storage devices wasting of storage space due to direct data storage.

To solve the above technical problems, the present disclosure provides a storage device. The storage device comprises a flash memory controller, an artificial intelligence (AI) processor, and a flash memory storage chip set. The flash memory controller is connected with the AI processor and the flash memory storage chip set separately.

The flash memory controller is configured to send original data to be stored to the AI processor when receiving an AI extension instruction from a host, and store tag data from the AI processor in the flash memory storage chip set.

The AI processor is configured to convert the original data from the flash memory controller into the tag data by a predetermined algorithm and send the tag data to the flash memory controller. The flash memory controller stores the tag data in the flash memory storage chip set.

Optionally, the storage device comprises an external interface. The external interface is connected with the flash memory controller. The flash memory controller receives the AI extension instruction from the host and the original data to be stored through the external interface.

When the flash memory controller receives a general storage instruction from the host, the flash memory controller directly stores the original data to be stored into the flash memory storage chip set.

Optionally, the external interface is selected from a USB interface, a UFS interface, an EMMC interface, an SD interface, a SPI interface, a SATA interface, a MSATA interface, a PCI-E interface, a DDR interface, an LPDDR interface, and a GDDR interface.

Optionally, the flash memory controller is integrated with a static random access memory. The flash memory controller stores the original data to be stored and to be sent to the AI processor from the flash memory controller and the tag data to be stored in the flash memory storage chip set from the flash memory controller through the static random access memory.

Alternatively, the storage device comprises a dynamic random access memory connected with the flash memory controller. The dynamic random access memory stores the original data to be stored and to be sent to the AI processor from the flash memory controller and the tag data to be stored in the flash memory storage chip set from the flash memory controller.

Optionally, the predetermined algorithm is selected from an AI image recognition algorithm, an AI speech recognition algorithm, and a logical reasoning algorithm.

The present disclosure further provides a storage control method executing by a storage device. The storage control method comprise steps:

sending original data to be stored to an AI processor when receiving an AI extension instruction from a host by a flash memory controller;

converting the original data from the flash memory controller into tag data according to a predetermined algorithm and sending the tag data to the flash memory controller by the AI processor; and storing the tag data in a flash memory storage chip set by the flash memory controller.

The storage device comprises the flash memory controller, the AI processor, and the flash memory storage chip set.

Optionally, the storage control method further comprises steps:

receiving the AI extension instruction from the host and the original data to be stored by an external interface of the storage device; and receiving a general storage instruction from the host and storing the original data to be stored into the flash memory storage chip set by the external interface of the storage device.

Optionally, the flash memory controller is integrated with a static random access memory. The storage control method further comprises:

storing the original data to be stored and to be sent to the AI processor and the tag data to be stored in the flash memory storage chip set through the static random access memory.

Optionally, the storage device comprises a dynamic random access memory connected with the flash memory controller. The storage control method further comprises:

storing the original data to be stored and to be sent to the AI processor and the tag data to be stored in the flash memory storage chip set through the dynamic random access memory.

Optionally, the predetermined algorithm is selected from an AI image recognition algorithm, an AI speech recognition algorithm, and a logical reasoning algorithm.

The storage device and storage control method of the present disclosure process the data to be stored by the AI processor integrated into the storage device, thereby greatly reducing an amount of data stored in the flash memory storage chip set, and improving storage space utilization of the flash memory storage chip set without occupying host resources.

DETAILED DESCRIPTION

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure.

Figure 1:
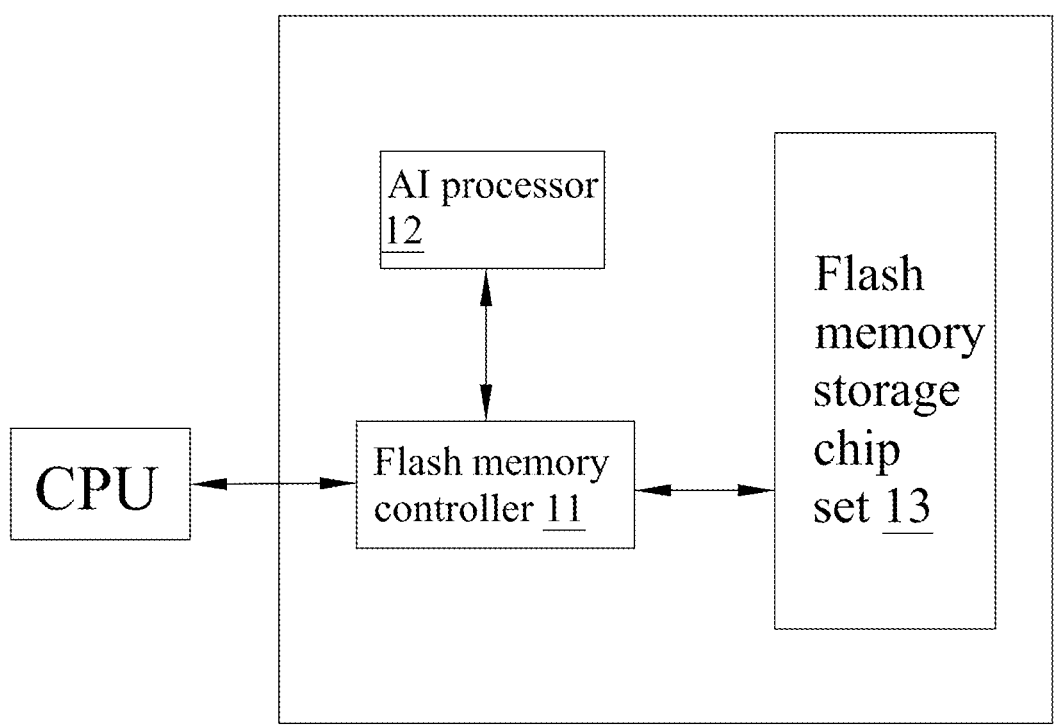
FIG. 1 is a schematic diagram of a storage device according to one embodiment of the present disclosure.

As shown in FIG. 1, FIG. 1 is a schematic diagram of a storage device according to one embodiment of the present disclosure. The storage device in the embodiment may be included in a solid state disk (SSD), a USB interface memory, a CF card, an SD card, a TF card, etc. The storage device comprises a flash memory controller 11, an artificial intelligence (AI) processor 12 and a flash memory storage chip set 13. The flash memory controller 11 is connected with the AI processor 12 and the flash memory storage chip set 13 separately to achieve transmission of control instructions. The flash memory storage chip set 13 is selected from NAND flash memory chips, which comprise multiple blocks with same storage capacity (according to specifications of different manufacturers, a capacity of each block may be 16 MB, 32 MB, etc.). Each block has a unique block address and is able to store data when the power is off.

Specifically, the above-mentioned flash memory controller 11, the AI processor 12, and the flash memory storage chip set 13 are integrated into a same printed circuit board (PCB). The flash memory controller 11 is connected with the AI processor 12 and the flash memory storage chip set 13 separately through the internal buses disposed on the PCB. Through the flash memory controller 11, operations such as bad block management, firmware loading, and host address prediction in the flash memory storage chip set 13 are implemented.

In the embodiment, the flash memory controller 11 sends original data to be stored (from a host) to the AI processor 12 when receiving an AI extension instruction (a date storage instruction) from the host (such as a central processing unit 21, a micro control unit or a direct memory access controller, etc.), and store tag data from the AI processor 12 in the flash memory storage chip set 13. Specifically, the flash memory controller 11 is integrated with a static random access memory (SRAM), so the flash memory controller 11 directly caches the control instructions from the host, and the storage device does not need to be configured with a dynamic random access memory (DRAM) chip set. The above AI extension instruction is different from general storage instructions. Only when the flash memory controller 11 receives the AI extension instruction, the flash memory controller 11 sends the original data to be stored to the AI processor 12. When the flash memory controller 11 receives a general storage instruction from the host, the flash memory controller 11 directly stores the original data to be stored into the flash memory storage chip set 13.

The AI processor 12 is configured to convert the original data from the flash memory controller 11 into the tag data by a predetermined algorithm and send the tag data to the flash memory controller 11. The flash memory controller 11 stores the tag data in the flash memory storage chip set 13. The above mentioned predetermined algorithm may be solidified in the AI processor 12, and the predetermined algorithm is selected from an inference algorithm (the inference algorithm has been trained on a large amount of data in other devices and mature parameters have been obtained).

The AI processor 12 integrated into the storage device processes the original data to be stored, so that an amount of data stored in the flash memory storage chip set 13 is greatly reduced, which improves a storage space utilization of the flash memory storage chip set 13 without occupying host resources.

In one embodiment of the present disclosure, the storage device comprises an external interface connected to an external bus (for example, a PCI-E bus or a SPI bus). In the embodiment, the PCB where the flash memory controller 11, the AI processor 12, and the flash memory storage chip set 13 are located is integrated with the external interface. The external interface is connected with the flash memory controller 11 (e.g., a flash memory control chip 11) through the internal buses on the PCB, thus, the flash memory control chip 11 interacts with the host through the external interface and the external bus, such as receiving the AI extension instruction or the general storage instruction from the host. The AI extension instruction refers to an instructions that processes current data through the AI processor 12, and the general storage instructions refer to instructions that directly store the current data to the flash memory storage chip set 13 without using the AI processor 12 to process the current data.

Specifically, the external interface is selected from a USB interface, a UFS interface, an EMMC interface, an SD interface, a SPI interface, a SATA interface, a MSATA interface, a PCI-E interface, a DDR interface, an LPDDR interface, and a GDDR interface. The external interface can be selected according to different application scenarios of the storage device. For example, when the storage device is applied to a computer system, the external interface is selected from the SPI interface, the SATA interface, the MSATA interface, the PCI-E interface, the DDR interface, the LPDDR interface, the GDDR interface, etc. When the storage device is applied to consumer electronic products such as cameras and voice recorders, the external interface is selected from the USB interface, the UHS interface, etc.

Figure 2:
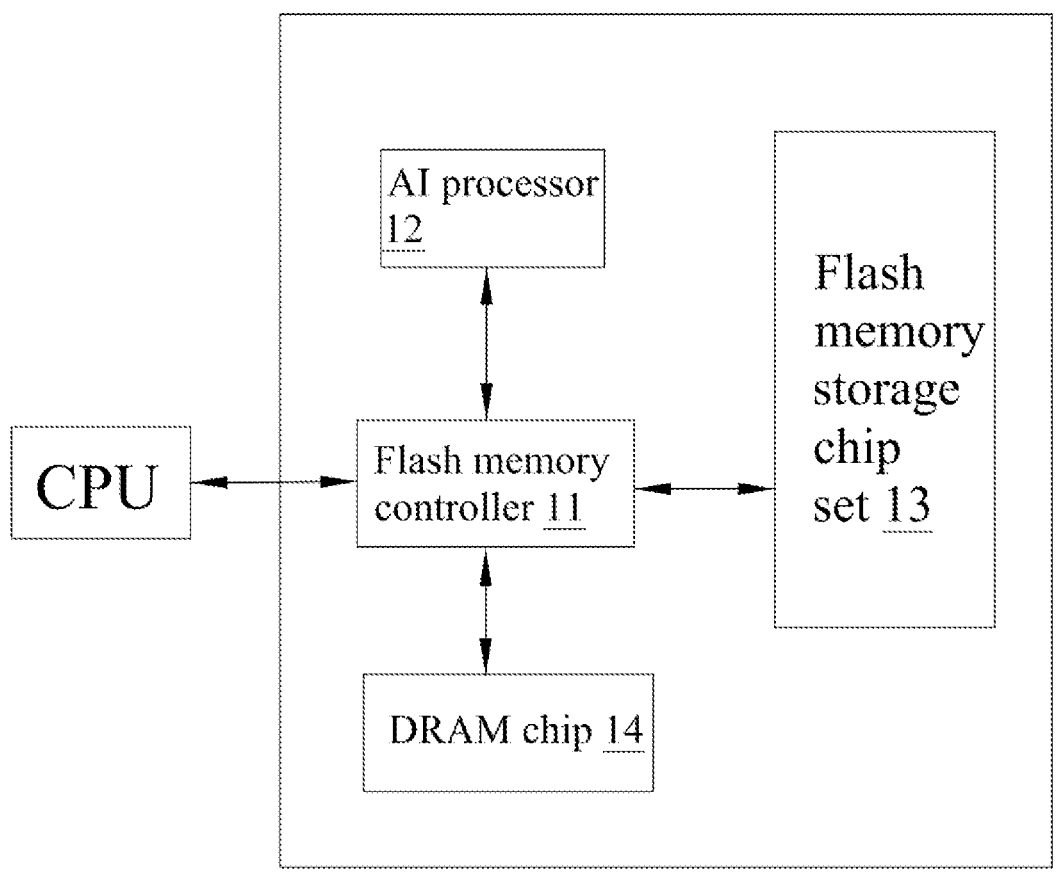
FIG. 2 is a schematic diagram of the storage device according to another embodiment of the present disclosure.

As shown in FIG. 2, the present disclosure provide a storage device in another embodiment of the present disclosure. The storage device comprises the flash memory controller 11, the AI processor 12, the flash memory storage chip set 13, and a dynamic random access memory (DRAM) chip 14.

In the embodiment, the flash memory controller 11 does not need to be integrated with the SRAM. The flash memory controller 11 is connected with DRAM chip 14 through the internal buses. The DRAM chip 14 stores the original data to be stored and to be sent to the AI processor 12 that sent by the flash memory controller 11 from the host and the tag data (generated by the AI processor 12) to be stored in the flash memory storage chip set 13 from the flash memory controller 11. Moreover, the DRAM chip 14 cooperates with the flash memory controller 11 to implement the operations such as bad block management, firmware loading, and host address prediction in the flash memory storage chip set 13. Compared with the embodiment of FIG. 1, a circuit of the storage device of the embodiment is relatively complicated, but requirements for the flash memory controller 11 are relatively low.

In an embodiment of the present disclosure, when the above-mentioned storage device is applied to the storage of video data or image data (for example, applied to a monitoring system or a camera and other equipment), the predetermined algorithm executed by the AI processor 12 is an AI image recognition algorithm. The AI image recognition algorithm is an image inference algorithm after a large number of original image training. According to different applications, the above-mentioned AI image recognition algorithm may be a face recognition algorithm, a dynamic object recognition algorithm, etc. When the flash memory controller 11 receives the AI extension instruction from the host (for example, a micro-control unit connected with a photosensitive chip), the flash memory controller 11 no longer stores the original video data obtained from the photosensitive chip, but directly stores tag data identified and obtained by the AI image recognition algorithm.

In another embodiment of the present disclosure, when the above-mentioned storage device is applied to voice data storage (for example, applied to equipment such as a voice recorder), the predetermined algorithm executed by the AI processor 12 is an AI speech recognition algorithm. The AI speech recognition algorithm is a speech inference algorithm trained on a large amount of original audio data. When the flash memory controller 11 receives the AI extension instruction from the host (such as a micro-control unit connected to a microphone), the flash memory controller 11 no longer stores the original audio data obtained from the micro-control unit, but directly stores the tag data (such as text) identified and obtained by the AI speech recognition algorithm.

Moreover, the above-mentioned storage device may also be applied to online trading systems, etc. Correspondingly, the predetermined algorithm executed by the AI processor 12 can be other logical reasoning algorithms to implement processing such as stock trading point prediction.

Figure 3:
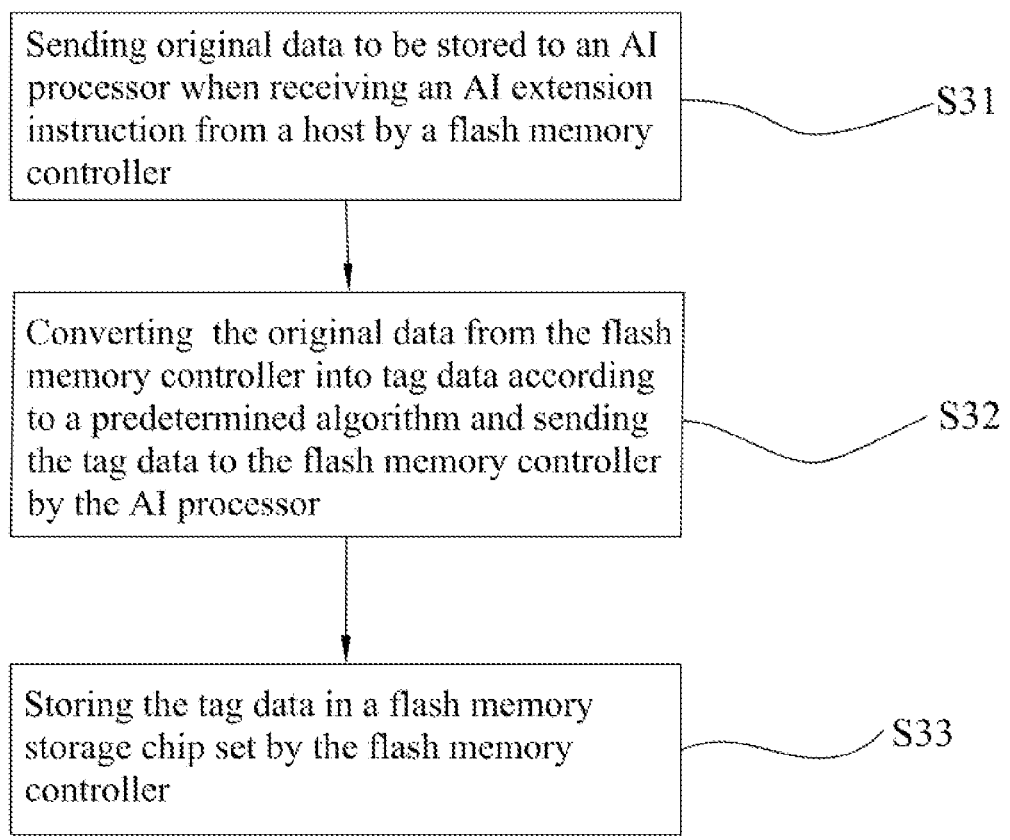
FIG. 3 is a flowchart of the storage control method according to one embodiment of the present disclosure.

As shown in FIG. 3, FIG. 3 is a flowchart of the storage control method according to one embodiment of the present disclosure. The storage control method is executed by a storage device. The storage device comprises a flash memory controller, an AI processor, and a flash memory storage chip set. Specifically, in the above-mentioned storage device, the flash memory controller, the AI processor, and the flash memory storage chip set are integrated into a same PCB. The flash memory controller is connected with the AI processor and the flash memory storage chip set separately through the internal buses on the PCB. Specifically, the storage control method comprise steps:

Step 31: sending original data to be stored to an AI processor when receiving an AI extension instruction from a host by a flash memory controller;

The above-mentioned flash memory controller receives control instructions from a host through an external interface integrated into the PCB where the flash memory controller is located. Specifically, the control instructions from the host comprise an AI extension instruction and a general storage instruction. When the flash memory controller receives a general storage instruction from the host through the external interface, it directly stores the original data to be stored in the flash memory chip set according to the general storage instruction instead of sending the original data to be stored to the AI processor.

The above-mentioned flash memory controller may be integrated with a SRAM, and the flash memory controller stores the original data to be stored and to be sent to the AI processor through the SRAM.

Alternatively, the above-mentioned flash memory controller may not integrate with the SRAM, and is connected with a DRAM disposed on the PCB. At this time, the flash memory controller stores the original data to be stored and to be sent to the AI processor through the DRAM.

Step 32: converting the original data from the flash memory controller into tag data according to a predetermined algorithm and sending the tag data to the flash memory controller by the AI processor, The above mentioned predetermined algorithm may be solidified in the AI processor 12, and the predetermined algorithm may be an inference algorithm (the inference algorithm has been trained on a large amount of data in other devices and obtained mature parameters).

Specifically, the predetermined algorithm is selected from an AI image recognition algorithm, an AI speech recognition algorithm, and a logical reasoning algorithm according to different application scenarios When the flash memory controller is integrated with the SRAM, and the flash memory controller stores the tag data generated by the AI processor and to be stored into the flash memory storage chip set. When the flash memory controller is not integrate with the SRAM, the flash memory controller stores the tag data generated by the AI processor and to be stored into the flash memory storage chip set through the DRAM.

Step 33: storing the tag data of the SRAM or DRAM in a flash memory storage chip set by the flash memory controller.

The storage control method in the embodiment belongs to a same concept as the storage device in the corresponding embodiments in FIGS. 1 and 2. The specific implementation process of the storage control method can be referred to the corresponding storage device embodiments, and technical features in the embodiments of the storage device can be applied to the embodiment of the storage control method, which would 1 not be repeated herein.

It should be understood that the order of the steps in the above-mentioned embodiments is not necessarily the order of the execution order, and the execution order of the steps should be determined by function and inherent logic, which should not be regarded as limitations to the implementation processes of the embodiments of the present disclosure.

In the above-mentioned embodiments, descriptions of each embodiment have their own emphasis. For parts that are not described in detail or recorded in one embodiment, reference may be made to related descriptions of other embodiments.

The above-mentioned embodiments are only used to illustrate technical solutions of the present disclosure, but not to limit the present disclosure. Although the present disclosure has been described in detail with reference to the foregoing embodiments. It should be understood that those of ordinary skill in the art are still able to modify the technical solutions described in the foregoing embodiments, or equivalently replace some of the technical features in the foregoing embodiments; and these modifications or replacements do not make the essence of the corresponding technical solutions deviate from spirit and scope of the technical solutions of the embodiment of the present disclosure, which shall be included in the protection scope of the present disclosure.

What is claimed is:

1. A storage device, comprising: a flash memory controller, an artificial intelligence (AI) processor, and a flash memory storage chip set; wherein the flash memory controller is connected with the AI processor and the flash memory storage chip set separately;
wherein the flash memory controller is configured to send original data desired to be stored in the flash memory storage chip set to the AI processor in response to receiving an AI extension instruction from a host, and store tag data output from the AI processor into the flash memory storage chip set, wherein the AI extension instruction is a data storage instruction;
wherein the AI processor is configured to convert the original data sent from the flash memory controller into the tag data using a predetermined algorithm and send the tag data to the flash memory controller, wherein a volume of the tag data is reduced compared against a volume of the original data to be stored by virtue of the conversion performed by the AI processor; the flash memory controller is configured to store the tag data into the flash memory storage chip set.

2. The storage device according to claim 1, wherein the storage device comprises an external interface; the external interface is connected with the flash memory controller; the flash memory controller receives the AI extension instruction from the host and the original data to be stored through the external interface;
wherein when the flash memory controller receives a general storage instruction from the host, the flash memory controller directly stores the original data to be stored into the flash memory storage chip set.

3. The storage device according to claim 2, wherein the external interface is selected from a USB interface, a UFS interface, an EMMC interface, an SD interface, a SPI interface, a SATA interface, a MSATA interface, a PCI-E interface, a DDR interface, an LTDDR interface, and a GDDR interface.

4. The storage device according to claim 1, wherein the flash memory controller is integrated with a static random access memory, the flash memory controller stores the original data to be stored and to be sent to the AI processor from the flash memory controller and the tag data to be stored in the flash memory storage chip set from the flash memory controller through the static random access memory.

5. The storage device according to claim 1, wherein the predetermined algorithm is selected from an AI image recognition algorithm, an AI speech recognition algorithm, and a logical reasoning algorithm.

6. The storage device according to claim 1, wherein the storage device comprises a dynamic random access memory connected with the flash memory controller; the dynamic random access memory stores the original data to be stored and to be sent to the AI processor from the flash memory controller and the tag data to be stored in the flash memory storage chip set from the flash memory controller.

7. The storage device according to claim 1, wherein the storage device is used in a monitoring system or a camera, and wherein the predetermined algorithm is an AI image recognition algorithm; wherein in response to receiving the AI extension instruction from the host, the flash memory controller is configured to no longer store original video data obtained by a photosensitive chip, but to directly store the tag data obtained by the AI image recognition algorithm executed by the AI processor to the flash memory storage chip set; wherein the AI image recognition algorithm is an image inference algorithm that has been trained by a number of original images.

8. The storage device according to claim 7, wherein the AI image recognition algorithm comprises a face recognition algorithm or a dynamic object recognition algorithm.

9. The storage device according to claim 1, wherein the storage device is used for voice data storage of a voice recorder and wherein the predetermined algorithm is an AI speech recognition algorithm; wherein in response to receiving the AI extension instruction from the host, the flash memory controller is configured to no longer store original voice data obtained by a control unit, but to directly store the tag data obtained by the AI speech recognition algorithm to the flash memory storage chip set; wherein the predetermined algorithm is an AI speech recognition algorithm that has been trained by an amount of original voice data, and wherein the tag data comprises text.

10. The storage device according to claim 1, wherein the storage device is used in an online trading system, and accordingly the predetermined algorithm executed by the AI processor is a logic reasoning algorithm to implement stock trading point prediction.

11. A storage control method executed by a storage device, the storage device comprising a flash memory controller, an artificial intelligence (AI) process, and a flash memory storage chip set, wherein the flash memory controller is connected with the AI processor and the flash memory storage chip set separately; wherein the storage control method comprises:
in response to receiving an AI extension instruction from a host by the flash memory controller, sending, by the flash memory controller, original data desired to be stored in the flash memory chip set to the AI processor, wherein the AI extension instruction is a data storage instruction;
converting, by the AI processor, the original data sent from the flash memory controller into tag data using a predetermined algorithm, and sending the tag data to the flash memory controller by the AI processor, wherein a volume of the tag data is reduced compared against a volume of the original data to be stored by virtue of the conversion performed by the AI processor; and
storing, by the flash memory controller, the tag data into the flash memory storage chip set.

12. The storage control method according to claim 11, further comprising:
receiving the AI extension instruction from the host and the original data desired to be stored ley an external interface of the storage device; and
receiving a general storage instruction from the host and storing the original data desired to be stored into the flash memory storage chip set by the external interface of the storage device.

13. The storage control method according to claim 11, wherein the flash memory controller is integrated with a static random access memory, the storage control method further comprises:

storing the original data to be stored and to be sent to the AI processor and the tag data to be stored in the flash memory storage chip set through the static random access memory.

14. The storage control method according to claim 11, wherein the storage device comprises a dynamic random access memory connected with the flash memory controller; the storage control method further comprises:

storing the original data to be stored and to be sent to the AI processor and the tag data to be stored in the flash memory storage chip set through the dynamic random access memory.

15. The storage control method according to claim 11, wherein the predetermined algorithm is selected from an AI image recognition algorithm, an AI speech recognition algorithm, and a logical reasoning algorithm.

\* \* \* \* \*